May 18, 1965  E. J. McQUILLEN  3,183,724
MECHANICAL ROTARY ACCELERATION SENSOR
Filed May 31, 1963
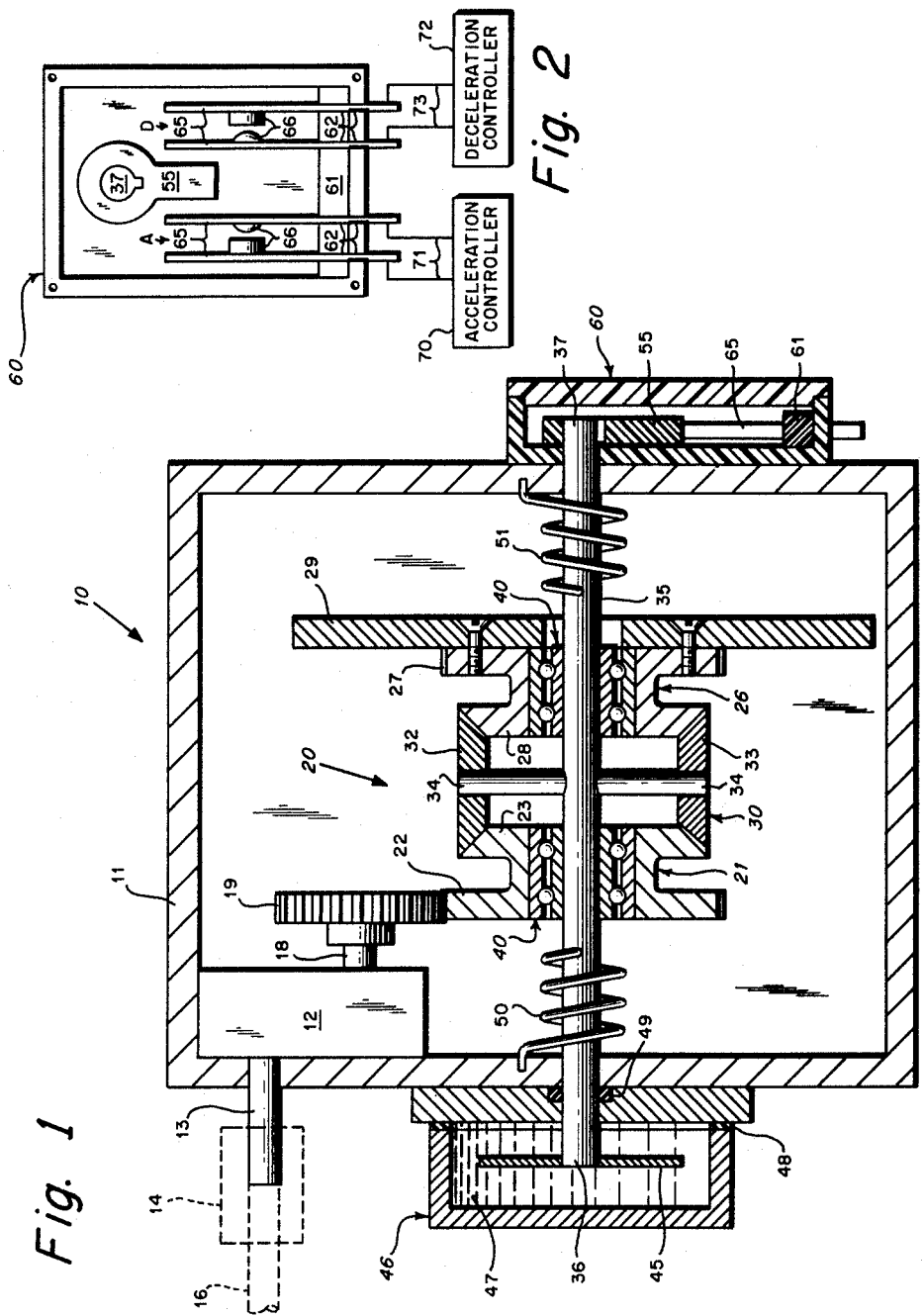
INVENTOR.
EDWARD J. McQUILLEN
BY
ATTORNEY

United States Patent Office

3,183,724
Patented May 18, 1965

3,183,724
MECHANICAL ROTARY ACCELERATION SENSOR
Edward J. McQuillen, Huntingdon Valley, Pa., assignor to the United States of America as represented by the Secretary of the Navy
Filed May 31, 1963, Ser. No. 284,755
1 Claim. (Cl. 73—514)
(Granted under Title 35, U.S. Code (1952), sec. 266)

The invention disclosed herein may be manufactured and used by or for the Government of the United States of America for governmental purposes without the payment of any royalties thereon or therefor.

This invention relates to a rotary acceleration sensing device and more particularly to a monitor which senses and responds when a preset, predetermined value of rotary acceleration or deceleration is exceeded.

In the field of air-launched, towed targetry, a combination reel and launcher assembly is secured to the towing aircraft. The reel is capable of towing a 200 lb. target at the end of 80 to 100,000 feet of tow line at speeds up to Mach 2. In addition, it is capable of reeling the target in and out at a speed of 60 miles per hour. To accomplish this, a ram air power unit with reversible pitch blades is utilized to drive the reel or tow line storage spool, the pitch of the propeller blades determining reel in or reel out. In order to preclude the power unit, tow line, and target secured thereto from accelerating beyond acceptable limits during the reeling operation, an electronic acceleration monitor is provided which energizes an electrical relay when a predetermined value of rotary acceleration is exceeded. This in turn opens a contact and deenergizes the blade pitch change motor to stop the blade rotation, thereby causing a deceleration of the power unit within acceptable ranges of acceleration. Upon reaching these acceptable limits the blade pitch change motor will again begin to rotate the propeller blades. The cost of the present electronic sensor is extremely high and in view of its complex nature, since transistors, capacitors, resistors, relays, etc. are utilized, the reliability has failed to meet the high operating standards required. Furthermore, the electronic monitors have been found sensitive to the temperatures encountered in tow target applications, these temperatures reaching —54° C. and introducing serious error in the monitoring operation.

It is an object of the present invention to provide a simply operated and inexpensive mechanical acceleration sensor for monitoring the rotary acceleration of a rotating element.

Another object of this invention is to provide a mechanical rotary acceleration device for sensing both acceleration and deceleration of a rotating member.

An additional object of this invention is to provide a rotary acceleration sensor of high sensitivity, reliability and accuracy and one which is satisfactorily operable at extreme ranges of temperature conditions.

Various other objects and advantages will appear from the following description of an embodiment of the invention and the novel features will be particularly pointed out hereinafter in connection with the appended claim.

In the drawing:
FIG. 1 is a sectional view of the rotary acceleration sensor; and
FIG. 2 is a side view of the sensor of FIG. 1 with the cover removed for purposes of clarity.

In the illustrated embodiment of the invention and first referring to FIG. 1, the rotary accelerations sensor is generally indicated at 10 includes a frame or support member 11 housing a gear box 12 which has a stub shaft 13 extending therefrom and through the support member 11. This outwardly extending shaft 13 is formed for connection by coupling 14 to a rotating shaft 16, the acceleration of which is to be monitored by the sensor 10. Both coupling 14 and shaft 16 are illustrated by dotted lines.

The output of gear box 12 is connected through shaft 18 to pinion gear 19 which in turn supplies rotational driving force for the bevel gear differential mechanism generally noted at 20. Differential mechanism 20 comprises a side assembly 21 including an input spur gear 22 meshing with the teeth on pinion gear 19 and an end gear 23. A similar side assembly 26 includes spur gear 27 and end gear 28, the spur gear 27 having an inertial rotor member 29 secured thereto by means of screws or other appropriate means. Inertial member 29 is disc-shaped, coaxially disposed with the side assembly 26 and is further of computed mass.

A spider generally indicated at 30 is interposed between the two side assemblies 21 and 26 and includes a pair of spider gears 32 and 33 rotatably mounted at the ends of a cross-shaft 34. Cross-shaft 34 is pinned or otherwise fixedly secured intermediate the ends thereof to a spider shaft 35 having the ends thereof rotatably mounted within the support member 11. Whereas the spider 30 is rigidly fastened to the spider shaft 35, side assemblies 21 and 26 and the inertial rotor member secured to side assembly 26 are coaxially disposed about and rotatably mounted on the spider shaft 35 by roller bearing assemblies 40.

An end 36 of spider shaft 35 extends through the frame member 11 and has a relatively thin disc element 45 of predetermined area rigidly secured at its center to the terminal portion of shaft 35. A chamber or enclosure 46, shown exaggerated for purposes of clarity, is rigidly secured to the frame member 11 by appropriate means and contains a viscous damping fluid 47 such as silicon oil or the like of preselected and predetermined viscosity. Appropriate sealing members 48 and 49 are provided to preclude the fluid 47 from escaping from the enclosure 46. The clearance between the disc member 45 and its enclosure is sized to develop the desired viscose shear stress in the fluid in order to critically dampen any oscillation of the spider shaft 35. The shear clearance, the shearing area, and the fluid viscosity of the silicon oil are all evaluated and determined for the purpose of obtaining critical damping, that is, to obtain an accurate indication of the acceleration in the shortest length of time. Critical damping is desired in opposition to overdamping or underdamping since underdamping will provide overshoot or shaft oscillation of too great a value and an extended period of time will elapse before a true and accurate value of acceleration could be determined. In the case of overdamping, although an accurate acceleration value will be reached without undue oscillation of the shaft 35, this will be obtained in a slow, continuing manner which will result in the elapse of a prolonged period of time.

In order to eliminate any dead zone in the rotation of the spider shaft 35 and the inaccuracies that result therefrom, a pair of preloaded torsion springs 50 and 51 are interconnected between the frame member 11 and the shaft 35 and each is stressed in opposition to the other. The springs 50 and 51 are of selected strength and are identically preloaded in order to preclude the rotation of shaft 35 except under preset and predetermined conditions of acceleration of the input shaft 16.

For the purposes of sensing acceleration above a preset value and controlling same, an arm element 55 of non-conductive material is fixedly keyed to shaft 35 at the end thereof and is housed within switch enclosure generally noted at 60. Enclosure 60 includes a non-conductive spacer element 61 of plastic or other appropriate material having notches 62 formed therein for retaining and spacing a plurality of parallel, highly resilient switch contact members 65 which include button contacts 66. A pair of switch members 65 are placed on each side of the arm 55, with one pair noted at A interconnected with an acceleration controller 70 by electrical conductors 71 and the other pair noted at D interconnected with a deceleration controller 72 by conductors 73. The controllers 70 and 72 may mechanically or electrically regulate the rotation of shaft 16.

Although the disclosed embodiment illustrates the output of shaft 35 being utilized to operate a switch for actuating a rotational control unit, this invention is applicable for other purposes, such as providing a signal to an operator on a control panel when acceleration exceeds the predetermined value or moving a wiper arm on a potentiometer to provide constant monitoring of the change in velocity of a rotating body.

In operation, the accelerator sensor 10 is joined by coupling 14 to an input shaft 16 for purposes of measuring or indicating the acceleration of the rotating input shaft 16 and the appropriate measuring, indicating or control unit is electrically connected to switch A and switch D at their lower terminal portions. When the input shaft rotates at a constant velocity, that is where there is no acceleration or deceleration, the side assembly 21 will rotate at a proportional velocity determined by the gear ratios within gear box 12 and the relationship with pinion gear 19 and input spur gear 22. This constant velocity rotation will be transferred by spider 30 to side assembly 26 and contiguous inertial rotor member 29, it being noted that the side assembly 26 and rotor 29 will rotate in a direction opposite to the rotation given the side assembly 21. In this condition of constant velocity the spider gears 32 and 33 rotate about the carrier shaft 34 but no rotation of 34 will occur. When there is a change in the velocity of the input shaft 16, that is, where there is an acceleration or deceleration, this motion will be transmitted to the side assembly 21. However, due to the effects of the inertial rotor member 29, the assembly 26–29 will tend to rotate at the prior initial and constant velocity thereby creating a differential speed which will be re-reflected by rotation of the cross-shaft 34 thereby rotating the spider shaft 35 in response thereto. The direction of rotation of spider shaft 35 will depend upon whether the input shaft 16 has been accelerated or decelerated. When its rotational movement is of sufficient extent to overcome the resistance of torsional springs 50 or 51, arm 55, held in a central position intermediate the adjacent pair of switch A and D by the placement of the preloaded torsion springs, will rotate and urge contact 66 of adjacent resilient switch element 65 to make contact with the other element 66.

Obviously many modifications and variations of the present invention are possible in the light of the above teachings. It is therefore to be understood that within the scope of the appended claim the invention may be practiced otherwise than as specifically described.

What is claimed is:

A device for accurately sensing and controlling speeds of rotation of revolving bodies comprising:

a support member, an output shaft journaled for rotation within said support member, first input gear means rotatably supported on said shaft and including a spur gear and a first end gear assembly, transmission means including a gear box secured to said support member having a stub shaft extending therefrom and formed for connection to the revolving body and further including a pinion gear extending from said gear box engaging said spur gear of said first input gear means, second input gear means rotatably supported on said shaft and including a second end gear assembly and a spur gear having a disc-shaped inertial rotor member rigidly secured thereto and coaxially disposed about said output shaft, said inertial rotor member being of predetermined mass and also freely rotatable about said shaft, differential gear means including a pair of spider gears engaging said adjacent first and second end gear assemblies and being rotatably secured at each end of a rod member, said rod member being fixed intermediate its ends to said output shaft to rotate said shaft when said first and second input gear means rotate at different speeds, a pair of equally preloaded torsion springs each secured between said support member and said output shaft in opposition to the other to provide a predetermined rotational resistive force, critical damping means including a relatively thin disc member rigidly secured to said output shaft and rotatable within a housing containing damping fluid for precluding oscillation of said output shaft, an arm member rigidly secured to said output shaft and rotatable therewith, a pair of parallel flexible switch members adjacent each side of said arm and including contact members intermediate the length thereof, and conducting means electrically interconnected between each of said pairs of switch members and a speed control circuit whereby said control circuit is energized when one of said contact members is urged by said arm into contacting relationship with the other of said contact members when the acceleration of the revolving body exceeds at predetermined value.

References Cited by the Examiner

UNITED STATES PATENTS

| | | | |
|---|---|---|---|
| 2,159,778 | 5/39 | Bush | 188—181 |
| 2,198,032 | 4/40 | Farmer | 73—514 |
| 2,403,605 | 7/46 | Lesnick | 73—507 |
| 2,435,319 | 2/48 | McCune | 73—514 |
| 2,595,195 | 4/52 | Hosterman | 73—507 |
| 2,900,465 | 8/59 | Weiss | 200—61.46 |

FOREIGN PATENTS 417,389 10/34 Great Britain.

RICHARD C. QUEISSER, *Primary Examiner.*

JAMES J. GILL, *Examiner.*